United States Patent
Dalsgaard et al.

(10) Patent No.: US 9,883,416 B2
(45) Date of Patent: Jan. 30, 2018

(54) USER EQUIPMENT REPORTING OF THE DETECTION OF BLINDLY CONFIGURED SECONDARY CELL

(71) Applicant: Nokia Technologies Oy, Espoo (FI)

(72) Inventors: Lars Dalsgaard, Oulu (FI); Sari Kaarina Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 14/242,465

(22) Filed: Apr. 1, 2014

(65) Prior Publication Data

US 2014/0307582 A1    Oct. 16, 2014

Related U.S. Application Data

(60) Provisional application No. 61/812,197, filed on Apr. 15, 2013.

(51) Int. Cl.
*H04W 24/10* (2009.01)
*H04L 5/00* (2006.01)

(52) U.S. Cl.
CPC .............. *H04W 24/10* (2013.01); *H04L 5/001* (2013.01); *H04L 5/0098* (2013.01)

(58) Field of Classification Search
None
See application file for complete search history.

(56) References Cited

U.S. PATENT DOCUMENTS

| | | | |
|---|---|---|---|
| 2011/0243106 A1* | 10/2011 | Hsu | H04L 5/0096 370/336 |
| 2012/0244903 A1 | 9/2012 | Fong et al. | |
| 2012/0275390 A1* | 11/2012 | Korhonen | H04W 74/006 370/329 |
| 2012/0281548 A1* | 11/2012 | Lin | H04W 72/085 370/242 |

(Continued)

FOREIGN PATENT DOCUMENTS

| | | |
|---|---|---|
| WO | 2012/154112 A1 | 11/2012 |
| WO | 2013/028119 A1 | 2/2013 |
| WO | 2014015810 | 1/2014 |

OTHER PUBLICATIONS

Extended European Search Report received for corresponding European Application No. EP 14159868, dated Aug. 8, 2014, 12 pages.

(Continued)

*Primary Examiner* — Duc Duong
(74) *Attorney, Agent, or Firm* — Mintz Levin Cohn Ferris Glovsky and Popeo, P.C.

(57) ABSTRACT

Methods and apparatus, including computer program products, are provided for reporting blindly configured carrier aggregation secondary cells. In one aspect there is provided a method. The method may include detecting, by the user equipment, a secondary cell configured for the user equipment to allow access for carrier aggregation, wherein the secondary cell is blindly configured by a network before the detecting by the user equipment; and sending, by the user equipment, a report representative of the detected secondary (Continued)

cell to notify the network of the detecting by the user equipment. Related apparatus, systems, methods, and articles are also described.

20 Claims, 4 Drawing Sheets

(56) References Cited

U.S. PATENT DOCUMENTS

| | | | | |
|---|---|---|---|---|
| 2013/0148535 A1* | 6/2013 | Baghel | .................. | H04L 1/0026 370/252 |
| 2013/0194947 A1* | 8/2013 | Ehsan | .................. | H04L 5/0098 370/252 |
| 2013/0322389 A1* | 12/2013 | Maeda | .................. | H04W 48/08 370/329 |
| 2014/0029514 A1* | 1/2014 | Yu | .................. | H04W 24/10 370/328 |
| 2014/0187246 A1* | 7/2014 | Jha | .................. | H04W 48/08 455/436 |
| 2014/0198676 A1* | 7/2014 | Han | .................. | H04W 24/10 370/252 |
| 2015/0200762 A1* | 7/2015 | Kim | .................. | H04L 1/1867 370/329 |
| 2015/0319778 A1* | 11/2015 | Folke | .................. | H04W 48/20 370/330 |
| 2015/0327094 A1* | 11/2015 | Lee | .................. | H04L 5/0035 370/252 |

OTHER PUBLICATIONS

Renesas Mobile Europe Ltd: "3GPP TSG-RAN WG4 Meeting 63AH; R4-63AH-0143; SCell activation/ deactivation timing", 3GPP Draft; R4-63AH-0143, 3rd Generation Partnership Project (3GPP), Mobile Competence Centre; 650 Route Des Lucioles; F-06921 Sophia-Antipolis Cedex; France, vol. RAN WG4, No. Oulu, Jun. 26, 2012-Jun. 28, 2012, Jun. 21, 2012.

Nokia Corporation "3GPP TSG-RAN WG4 meeting 65; R4-126498; SCell Activiation time discussion", 3GPP Draft; R4-126498, 3rd Generation Partnership Project (3GPP), Mobile Competence Centre; 650, Route Des Lucioles; F-06921 Sophia-Antipolis Cedex; France, vol. RAN WG4, No. New Orleans, USA, Nov. 5, 2012.

"SCell Reporting Issues", 3GPP TSG-RAN WG4 Meeting #66, R4-130402, Agenda: 5.3, Qualcomm Incorporated, Jan. 28-Feb. 1, 2013, pp. 1-2.

"3rd Generation Partnership Project; Technical Specification Group Radio Access Network; Evolved Universal Terrestrial Radio Access (E-UTRA); Requirements for Support of Radio Resource Management (Release 8)", 3GPP TS 36.133, V8.21.0, Mar. 2013, pp. 1-338.

"3rd Generation Partnership Project; Technical Specification Group Radio Access Network; Evolved Universal Terrestrial Radio Access (E-UTRA); Radio Resource Control (RRC); Protocol Specification (Release 8)", 3GPP TS 36.331, V8.19.0, Mar. 2013, pp. 1-216.

* cited by examiner

USER EQUIPMENT REPORTING OF THE DETECTION OF BLINDLY CONFIGURED SECONDARY CELL

FIELD

The subject matter described herein relates to wireless communications and, in particular, carrier aggregation and the configuration and activation of one or more secondary cells (SCells).

BACKGROUND

Carrier aggregation allows increased bandwidth and, as such, increased data rates to a user equipment by aggregating carriers. For example, a user equipment may be allocated a primary carrier serving a primary cell (PCell) and one or more secondary carriers serving corresponding secondary cells (SCells). These carriers may be continuous within the same frequency band, non-contiguous within a given frequency band, or non-contiguous among frequency bands.

Blind SCell configuration refers to a network configuring one or more SCells for a user equipment, without the user equipment first detecting and/or reporting the SCells to the network. As such, before the user equipment detects and/or reports a cell to the network, the network has blindly configured the cell as a SCell for the user equipment, so the SCell is available for the user equipment when the user equipment subsequently detects SCell and SCell is activated. Although the network knows when configuring a given SCell blindly that the user equipment has not yet detected the SCell, the network presumes the user equipment (given its current location based on for example a current serving PCell) will at some point detect the SCell and activate the SCell to enable data transmission through the SCell.

SUMMARY

Methods and apparatus, including computer program products, are provided for reporting blindly configured carrier aggregation secondary cells. In one aspect there is provided a method. The method may include detecting, by the user equipment, a secondary cell configured for the user equipment to allow access for carrier aggregation, wherein the secondary cell is blindly configured by a network before the detecting by the user equipment; and sending, by the user equipment, a report representative of the detected secondary cell to notify the network of the detecting by the user equipment.

In some variations, one or more of the features disclosed herein including the following features may optionally be included in any feasible combination. The report may include an identity of the secondary cell. The sending may be performed before the secondary cell is activated for the carrier aggregation. The report may include a measurement report including one or more measurements of the detected secondary cell. The one or more measurements may include at least one of a reference signal received power measurement or a reference signal received quality measurement. The one or more measurements may be at least predefined in a standard or configured in a measurement configuration provided by the network. An event reporting criteria may be triggered, when the secondary cell is detected. The event reporting criteria may be predefined in a standard. The user equipment may access a primary cell including a primary carrier for a first data transmission and may further access the detected secondary cell including a secondary carrier for a second data transmission. The secondary cell may include a plurality of secondary cells.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
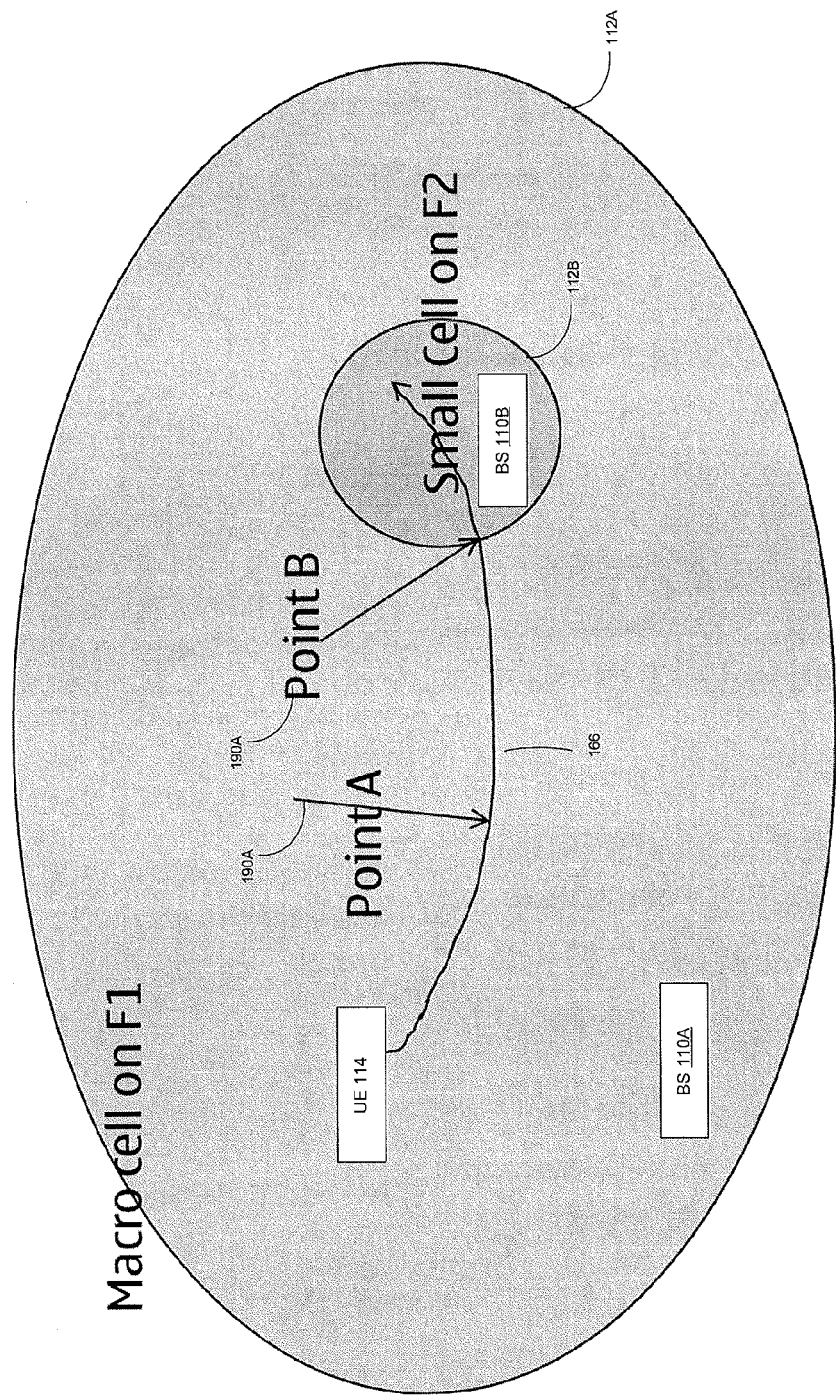
FIG. 1 depicts an example of a system configured for carrier aggregation including a primary cell and a secondary cell, in accordance with some exemplary embodiments.

Like labels are used to refer to same or similar items in the drawings.

DETAILED DESCRIPTION

The subject matter disclosed herein provides a way for the network to know when the user equipment has actually detected a blindly configured SCell(s). Specifically, there is provided a way of reporting to the network when the user equipment has detected one or more preconfigured (for example, blindly configured) SCells—allowing the network to command activation or use, if it so chooses, the detected SCell for data transmission by a subsequent activation of the detected SCell. Moreover, the detected SCell may be reported rather than requiring the user equipment to for example periodically report non-detected secondary cells. Furthermore, the user equipment reporting of the blindly configured SCell may, in some example embodiments, prevent unnecessary activation of blindly configured SCells (for example, sending an activation command for the SCell before the user equipment is within range of the SCell may be considered at the very least a waste of network resources).

In some example embodiments, there is provided a reporting rule (for example one or more criteria) and a measurement report defined and applied for blindly configured SCell, such as SCells preconfigured by the network for use by a user equipment in carrier aggregation before the user equipment has had a chance to detect the SCell. For example, when the user equipment detects a blindly configured SCell, the user equipment may, in some example embodiments, report to the network that it has now detected a blindly configured SCell. In some example embodiments, this reporting may include an identification of the detected blindly configured SCell, such as an identifier of the SCell, a physical cell identity (PCI) of the SCell, and the like. Because the network knows beforehand that it has configured the given SCell blindly for use by the given user equipment, when this user equipment sends to the network a report indicating a detection of the given SCell, the network may thus detect (for example, presume, recognize, detect, understand, and the like) that the given SCell is being reported to the network as a blindly configured SCell now being detected by the given user equipment. Accordingly, no further measurement control signaling is required to notify the network why it is receiving the SCell identifier sent by the given user equipment.

In some example embodiments, the report sent by the user equipment to the network may, as noted, indicate that the user equipment has detected a blindly configured SCell. Moreover, the report may be defined, so that when the user equipment successfully detects the blindly configured SCell and performs a measurement (for example, an initial reference signal received power (RSRP) measurement and/or a reference signal received quality (RSRQ) measurement) of the SCell, the user equipment reports the measurement(s) including an identifier of the detected SCell.

Although some of the examples described herein refer to detecting and reporting a single blindly configured SCell, the user equipment may detect and report a plurality of blindly configured SCells as well. Moreover, this reporting may use normal SCell measurement reporting used for detected SCells.

In some example embodiments, the reporting of the detected blindly configured SCell may be based on one or more criteria defined at the user equipment, so that when the criteria are satisfied a report is sent to the network. For example, an event reporting criterion may specify that the user equipment should send a measurement report when a blindly configured SCell is detected, and this reporting criterion may specify the type of measurements (for example, RSRP, RSRQ, and/or any other power/quality metrics) to be sent to the network when the event reporting criteria is triggered at the user equipment.

Event reporting criteria may be provided to the user equipment by the network and/or specified in a standard. For example, the event reporting criteria may be defined as an event that triggers reporting in a manner similar to Events A1, A2, and the like described in 3rd Generation Partnership Project, Technical Specification Group Radio Access Network, Evolved Universal Terrestrial Radio Access (E-UTRA) Radio Resource Control (RRC), Protocol specification (Release 8) TS 36.331 (herein after TS 36.331); 3rd Generation Partnership Project, Technical Specification Group Radio Access Network, Evolved Universal Terrestrial Radio Access (E-UTRA), Requirements for support of radio resource management (Release 8) 3GPP TS 36.133 (hereinafter TS 36.133), and/or any other standards as well. For example, an event may be defined so that the user equipment triggers a report when a blindly configured SCell is detected. Moreover, the event trigger may define one or more measurements, such as RSRP and/or RSRQ, to be performed by the user equipment, and these measurements may be configurable or selectable by the network (for example, the network may request in a measurement configuration what types of measurements the user equipment should perform on the detected SCell). For example, the event may specify that the measurement report should be sent to the network when (for example, as soon as) the user equipment detects the SCell (which may be based on the identity of the Scell, such as physical cell identity (PCI)) and performs an initial RSRP or RSRQ SCell measurement (which would be included in the measurement report).

The criteria that trigger the user equipment to send a report to the network may be that the user equipment has detected the blindly configured SCell (for example, the user equipment has be able find the identity, PCI, and the like of that SCell using a cell search procedure). In addition to the identity of the detected SCell, this report may include a measurement, such as the RSRP level and/or RSRQ level, for the detected SCell. However, the measured RSRP or RSRQ in the report may, in some example embodiments, not need to satisfy a certain predefined threshold (for example, above or below a given threshold for a certain measurement).

In some example embodiments, the measurements of the blindly configured SCell(s) may be performed in accordance with SCell measurement configuration or control information. In some example embodiments, the types of measurements made by the user equipment of a blindly detected SCell (which are subsequently reported to the network) may be statically defined in a standard or defined in accordance with an explicit request from the network. In addition, the measurements may, in some example embodiments, be defined as dedicated measurement control information, although such dedicated definition may not be used as well.

FIG. 1 depicts an example of a system 100 including a user equipment (UE) 114 detecting a blindly configured SCell 112B. The phrase blindly configured refers to the network (for example, a node therein, such as base station 110A serving PCell 112A) preconfiguring SCell 112B and serving access point/base station 110B to provide a carrier aggregation SCell for user equipment 114 before user equipment 114 detects SCell 112B and/or reports the Scell. The inter-site carrier aggregation depicted at FIG. 1 includes a macrocell 112A acting as a PCell served by a macrocell base station 110A (for example, an evolved Node B base station and the like) on a first carrier, such as frequency F1, and a small cell 112B acting as a SCell, which is served by a base station 110B on a second carrier, such as frequency F2. Although FIG. 1 depicts inter-site carrier aggregation, other types of carrier aggregation may be used as well.

Furthermore, FIG. 1 depicts the path 166 traveled by the user equipment. At point A 190A, the user equipment 114 has not yet detected the small cell 112 B blindly configured by the network including base station 110A since the user equipment 114 is not sufficiently close to SCell 112B including base station 110B. At point B 190B however, user equipment 114 is sufficiently close to detect the blindly configured SCell 112B including base station 110B. As such, user equipment 114 may, in some example embodiments, send a report indicating the detection of SCell 112B, and this report may include information, such as the identity of the SCell 112B, measurement information, and/or the like. Furthermore, this report may, as noted above, be trigger by an event reporting criteria.

Although FIG. 1 depicts a certain quantity of user equipment, base stations, and cells including SCells and PCells, other quantities and configurations may be used as well.

Figure 2:
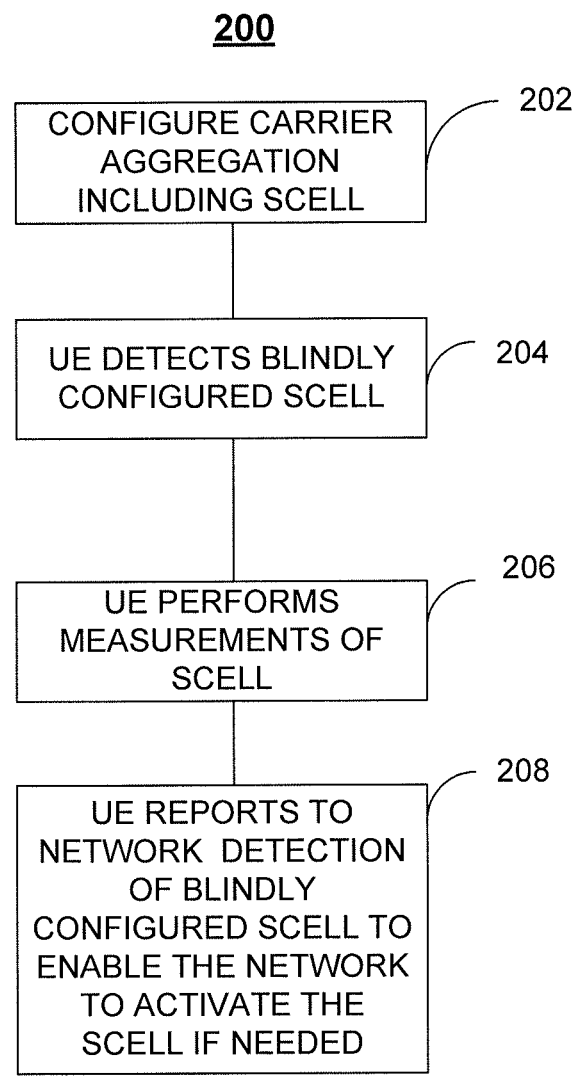
FIG. 2 depicts an example processes for user equipment reporting of a blindly configured secondary cell, in accordance with some exemplary embodiments.

FIG. 2 depicts an example process 200 for user equipment reporting of a blindly detected SCell, in accordance with some example embodiments. The description of FIG. 2 also refers to FIG. 1.

At 202, a network, such as a cellular radio access network including base station 110A and/or another base station/node, may configure user equipment 114 with carrier aggregation and may configure small cell 112B to provide a SCell for user equipment 114, in accordance with some example embodiments. Moreover, the network may configure the SCell 112B blindly before user equipment detects SCell 112B, in accordance with some example embodiments.

At 204, user equipment 114 may detect blindly configured SCell 112B, in accordance with some example embodiments. For example, user equipment 114 may detect at point B 190B, the blindly configured SCell 112B, and this detection may be based on the identity of the Scell (for example, the user equipment may detect the PCI of the SCell 112B as that of a secondary cell which should be accessed for carrier aggregation). In some example embodiments, the user equipment 114 may include event reporting criteria. This event reporting criteria may specify that user equipment 114 should send a measurement report when a blindly configured SCell is detected, and this reporting criteria may specify the type of measurements (for example, RSRP, RSRQ, and/or any other power/quality metrics) to be sent to the network when the event reporting criteria is triggered at the user equipment.

At 206, user equipment 114 may, in accordance with some example embodiments, perform one or more measurements, such as RSRQ measurements and RSRP measurements, of the SCell 112B, which has been blindly configured by the network for carrier aggregation. The types of measurements may be requested in a measurement configuration sent by the network, statically defined in for example a standard, and the like.

At 208, user equipment 114 may report the detection of the blindly configured SCell 112B and/or the measurements made at 206, in accordance with some example embodiments. For example, user equipment 114 may send a report to the network, such as base station 110A. The report may include the identity of the blindly configured SCell 112B, one or more measurements of the SCell 112B, and the like. Once the network receives the report sent at 208, the network may activate the SCell 112B for use when communication with user equipment 114, if user equipment 114 has not activated the SCell 112B.

Figure 3:
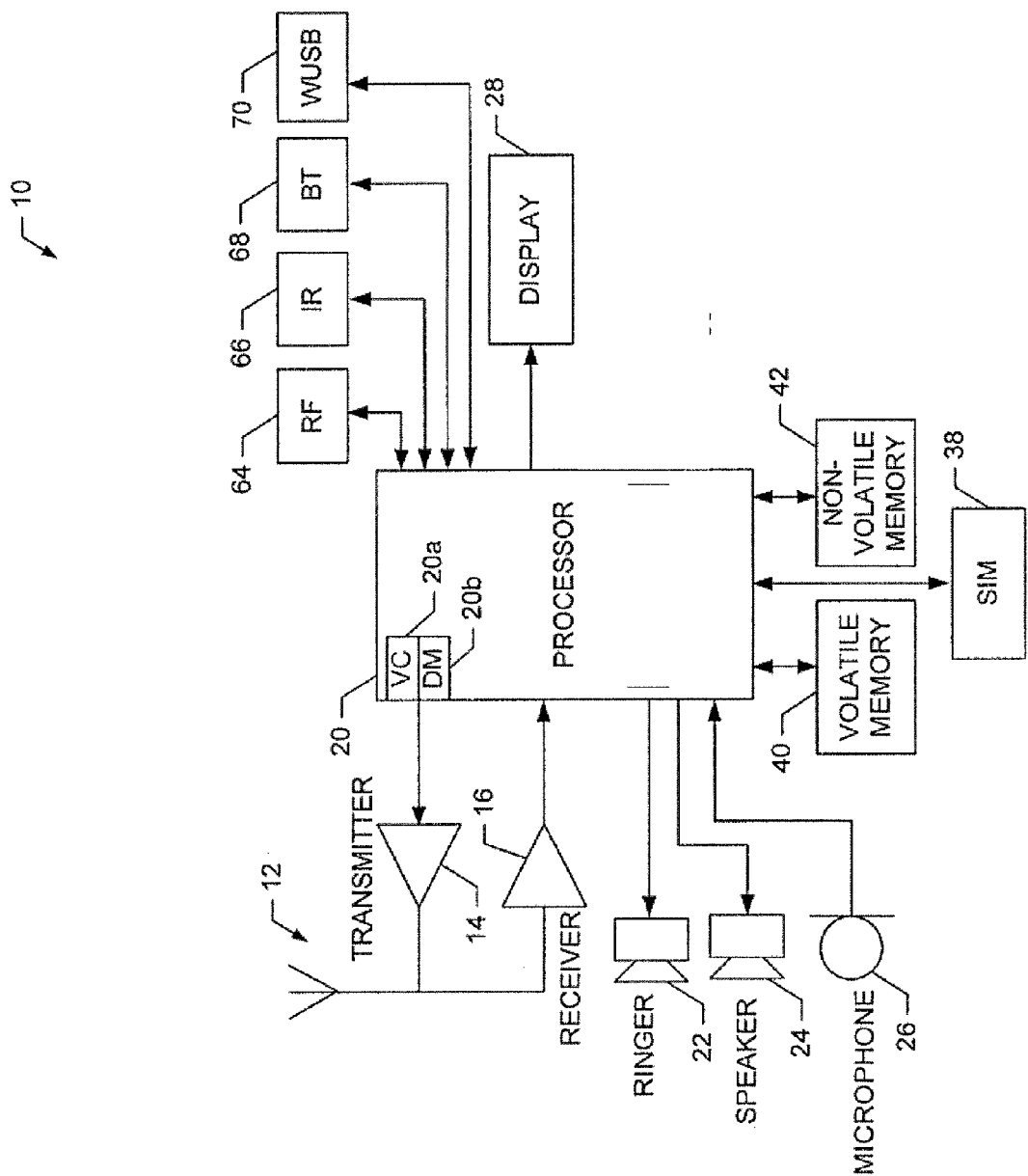
FIG. 3 depicts an example of a user equipment, in accordance with some exemplary embodiments.

FIG. 3 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at process 200 (for example, detect the SCell, trigger a measurement report indicating the detection of the SCell, and/or the like). The memories may comprise an identifier, such as for example, an international mobile equipment identification (IMEI) code, capable of uniquely identifying apparatus 10. In the example embodiment, the processor 20 may be configured using computer code stored at memory 40 and/or 42 to enable the user equipment to detect and/or measure SCells, trigger reporting events, and/or any other function associated with the user equipment or apparatus disclosed herein.

Figure 4:
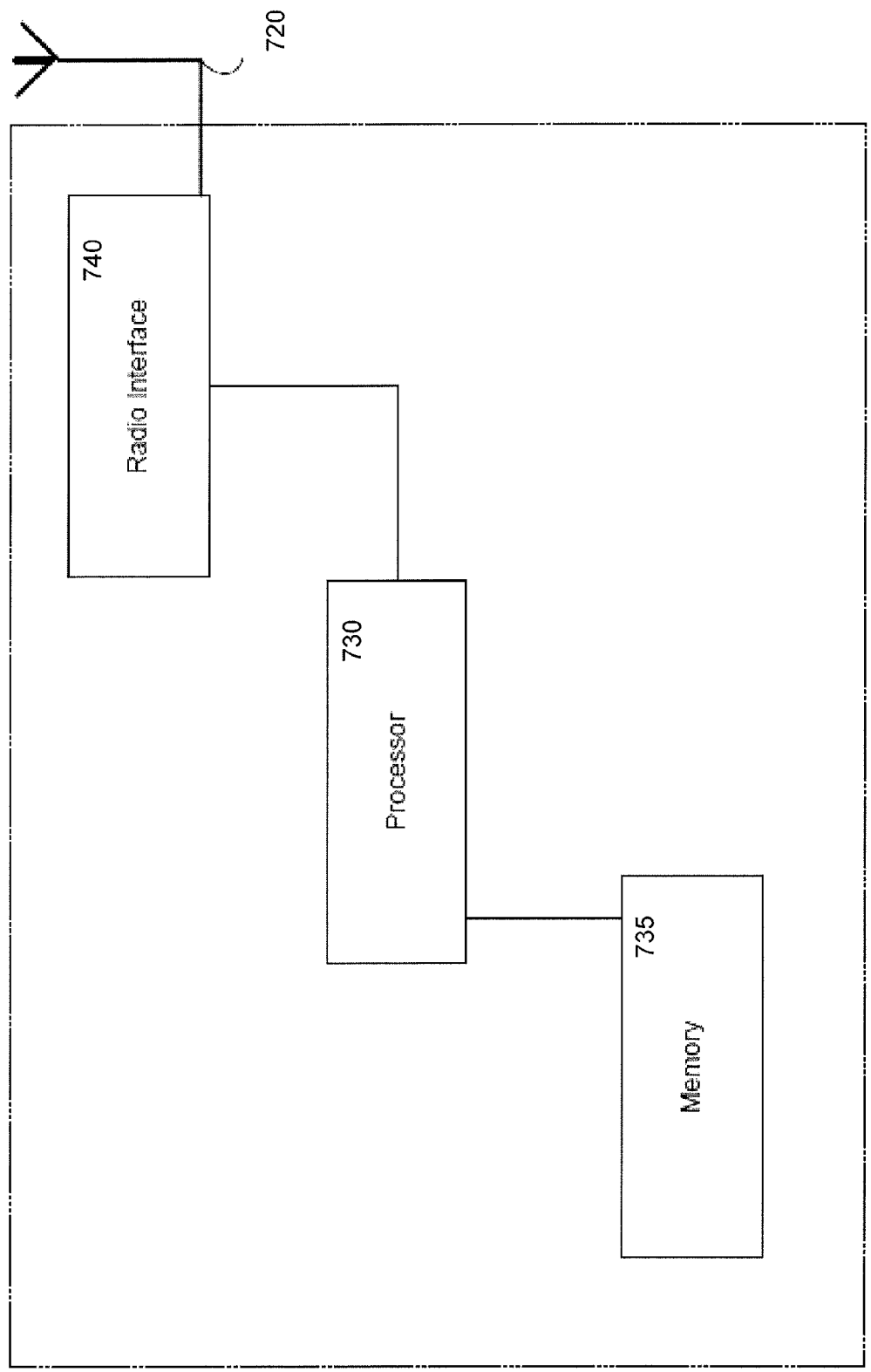
FIG. 4 depicts an example of a base station, in accordance with some exemplary embodiments.

FIG. 4 depicts an example implementation of a network node, such as a base station, access point, and/or any other type of node. The network node may include one or more antennas 720 configured to transmit via a downlink and configured to receive uplinks via the antenna(s) 720. The network node may further include a plurality of radio interfaces 740 coupled to the antenna 720. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 740 may further include other components, such as filters, converters (for example, digital-to-analog converters and/or the like), mappers, a Fast Fourier Transform (FFT) module, and/or the like, to generate symbols for a transmission via one or more downlinks and to receive symbols (for example, via an uplink). The network node may further include one or more processors, such as processor 730, for controlling the network node and for accessing and executing program code stored in memory 735. In some example embodiments, memory 735 includes code, which when executed by at least one processor causes one or more of the operations described herein with respect to a base station and/or a wireless access point. For example, the network node may configure the SCell, receive the report regarding the detection of the SCell, activate the SCell when detected, and/or the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 3 and 4. A computer-readable medium may comprise a non-transitory computer-readable storage medium that may be any media that can contain or store the instructions for use by or in connection with an instruction execution system, apparatus, or device, such as for example, a computer. Moreover, some of the embodiments disclosed herein include computer programs configured to cause methods as disclosed herein (see, for example, process 200 and/or the like).

Without in any way limiting the scope, interpretation, or application of the claims appearing below, a technical effect of one or more of the example embodiments disclosed herein may include increased predictability of blind cell activation and/or the like.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   detecting, by a user equipment, a secondary cell, wherein the secondary cell is blindly configured by the network to allow the user equipment to access the secondary cell for carrier aggregation, wherein the secondary cell is blindly configured by the network before the detecting by the user equipment; and
   sending, by the user equipment and in response to the detecting, a report representative of the detected secondary cell to notify the network of the detecting by the user equipment, wherein the sending is performed before the secondary cell is activated for the carrier aggregation, wherein the report is an event report defined to trigger event reporting in response to at least one blindly configured secondary cell being detected by the user equipment.

2. The method according to claim 1, wherein the event report includes an identity of the secondary cell and at least one measurement made with respect to the secondary cell.

3. The method according to claim 1, wherein the report includes at least one measurement of the detected secondary cell.

4. The method according to claim 3, wherein the at least one measurement includes at least one of a reference signal received power measurement or a reference signal received quality measurement.

5. The method according to claim 4, wherein the at least one measurement is at least predefined in a standard or configured in a measurement configuration provided by the network.

6. The method according to claim 1, further comprising:
   triggering an event reporting criteria defined to trigger event reporting in response to at least one blindly configured secondary cell being detected by the user equipment.

7. The method according to claim 6, wherein the event reporting criteria is predefined in a standard.

8. The method according to claim 1, wherein the user equipment accesses a primary cell including a primary carrier for a first data transmission and further accesses the detected secondary cell including a secondary carrier for a second data transmission.

9. The method according to claim 1, wherein the secondary cell comprises a plurality of secondary cells.

10. The method of claim 1, wherein the blindly configured secondary cell includes a base station configuring the secondary cell for carrier aggregation before the user equipment detects and/or reports the secondary cell to the base station.

11. An apparatus, comprising:
    at least one processor; and
    at least one memory including computer program code, the at least one memory and the computer program code configured to, with the at least one processor, cause the apparatus to at least:
      detect a secondary cell, wherein the secondary cell is blindly configured by the network to allow the apparatus to access the secondary cell for carrier aggregation, wherein the secondary cell is blindly configured by the network before the detecting by the apparatus; and
      send, and in response to the detection, a report representative of the detected secondary cell to notify the network of the detecting by the apparatus, wherein the report is before the secondary cell is activated for the carrier aggregation, wherein the report is an event report defined to trigger event reporting in response to at least one blindly configured secondary cell being detected by the user equipment.

12. The apparatus according to claim 11, wherein the event report includes an identity of the secondary cell and at least one measurement made with respect to the secondary cell, wherein the apparatus comprises, and/or is comprised in, a user equipment.

13. The apparatus according to claim 11, wherein the report includes at least one measurement of the detected secondary cell.

14. The apparatus according to claim 13, wherein the at least one measurement includes at least one of a reference signal received power measurement or a reference signal received quality measurement.

15. The apparatus according to claim 14, wherein the at least one measurement is at least predefined in a standard or configured in a measurement configuration provided by the network.

16. The apparatus according to claim 11, wherein the apparatus is further caused to at least trigger an event reporting criteria defined to trigger event reporting in response to at least one blindly configured secondary cell being detected by the user equipment.

17. The apparatus according to claim 16, wherein the event reporting criteria is predefined in a standard.

18. The apparatus according to claim 11, wherein the apparatus accesses a primary cell including a primary carrier for a first data transmission and further accesses the detected secondary cell including a secondary carrier for a second data transmission.

19. The apparatus of claim 11, wherein the apparatus comprises a user equipment.

20. A non-transitory computer-readable medium encoded with instructions that, when executed by at least one processor, performs at least:
    detecting, by a user equipment, a secondary cell, wherein the secondary cell is blindly configured by the network to allow the user equipment to access the secondary cell for carrier aggregation, wherein the secondary cell is blindly configured by the network before the detecting by the user equipment; and sending, by the user equipment and in response to the detecting, a report representative of the detected secondary cell to notify the network of the detecting by the user equipment, wherein the sending is performed before the secondary cell is activated for the carrier aggregation, wherein the report is an event report defined to trigger event reporting in response to at least one blindly configured secondary cell being detected by the user equipment.

* * * * *